United States Patent [19]
Medler

[11] 4,022,864
[45] May 10, 1977

[54] METHOD OF FORMING GLASS FIBER CONSTRUCTION MEMBER

[75] Inventor: Albert Medler, Jackson, Mich.

[73] Assignee: Plastigage Corporation, Jackson, Mich.

[22] Filed: Sept. 22, 1972

[21] Appl. No.: 291,219

Related U.S. Application Data

[62] Division of Ser. No. 74,151, Sept. 21, 1970, Pat. No. 3,709,754, which is a division of Ser. No. 700,287, Jan. 24, 1968, Pat. No. 3,574,104.

[52] U.S. Cl. .............................. 264/257; 264/263
[51] Int. Cl.² ...................... B29D 3/02; B29D 9/00
[58] Field of Search .......... 264/229, 231, 241, 257, 264/258, 263, 265, 137, 174, 271; 156/160, 161, 163; 161/176

[56] References Cited
UNITED STATES PATENTS

| | | | |
|---|---|---|---|
| 2,749,266 | 6/1956 | Eldred ................................ 264/137 |
| 2,903,388 | 9/1959 | Jonke et al. .................... 264/271 X |
| 2,964,442 | 12/1960 | Hansen .............................. 264/229 |
| 3,000,429 | 9/1961 | Warneken ...................... 156/161 X |
| 3,111,569 | 11/1963 | Rubenstein ..................... 264/265 X |
| 3,148,102 | 9/1964 | Eakins et al. ....................... 156/161 |
| 3,349,157 | 10/1967 | Parsons .......................... 264/258 X |

*Primary Examiner*—Willard E. Hoag
*Attorney, Agent, or Firm*—Beaman & Beaman

[57] ABSTRACT

The invention pertains to a method for forming a construction member of glass fiber elements impregnated with a hardened resin. The method includes the interposing of elongated, high density, glass fiber rods consisting of a plurality of longitudinally disposed glass fibers bonded together with a hardened binder resin while under tension between layers of glass fiber fabric impregnated with a hardenable resin. The resin of the fabric impregnates the interstices between the rods forming a high strength integral, homogeneous, bonded member. The method of the invention is used to form plank type members of linear or curved configuration wherein a mold is usually utilized.

2 Claims, 8 Drawing Figures

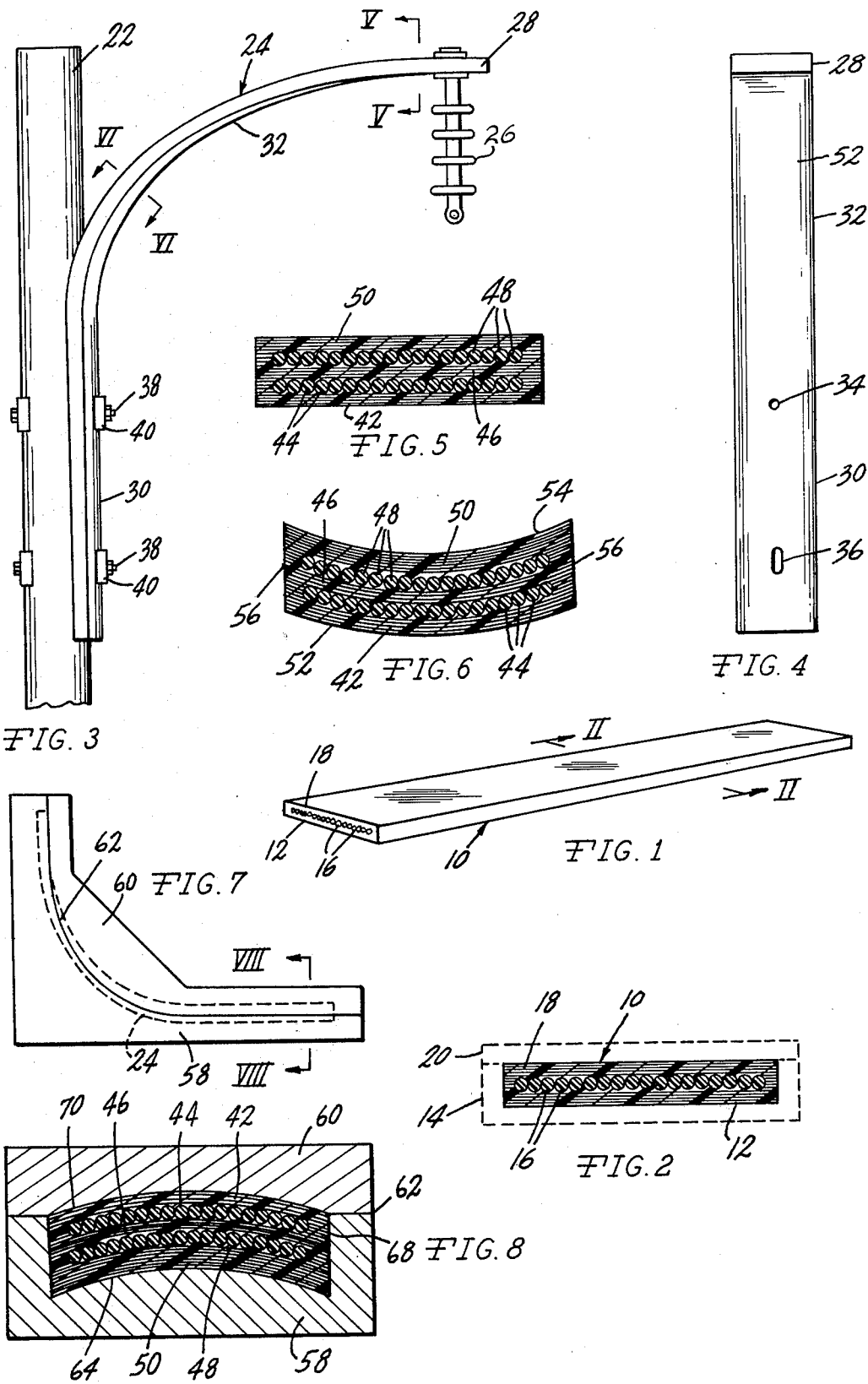

METHOD OF FORMING GLASS FIBER CONSTRUCTION MEMBER

REFERENCE TO RELATED APPLICATIONS

This application is a division of my application Ser. No. 74,151 filed Sept. 21, 1970, now U.S. Pat. No. 3,709,754 which is a division of application Ser. No 700,287, filed Jan. 24, 1968, now U.S. Pat. No. 3,574,104 granted Apr. 6, 1971.

BACKGROUND OF THE INVENTION

The invention pertains to the field of art of making construction members which are fabricated of separate components of similar and chemically compatible elements, namely glass fiber and a hardened resin, to produce improved mechanical characteristics, particularly with respect to resisting bending and lateral deflection.

A number of attempts have been made to produce acceptable poles, planks and other construction members of glass fibers impregnated with a hardened resin. U.S. Pat. No. 3,013,584 illustrates a tubular supporting member which was produced in order to employ the advantages of glass fiber materials. While the aformentioned patent illustrates the concept of inner and outer tubular glass fiber portions having a honeycomb interposed therebetween, the construction of prior art devices is not of such a nature as to provide the necessary resistance to bending moments and lateral deflection which is often required in a construction member. For instance, it is highly desirable to use a construction material in the manufacture of electric power transmission systems which is nonconducting, resistant to weathering and corrosive influences, relatively inexpensive, and attractive in appearance. While most lower voltage transmission poles were previously formed of wood, other materials are now being employed in order to overcome the lack of uniformity of wood transmission poles with respect to appearance and resistance to the weather. Furthermore, in that it is the tendency for wood power transmission components to bend under high lateral forces, it is necessary to use multiple components and guy cables with wood transmission components in order to produce the necessary resistance to bending. For instance, electrical utility system cross arm dead-ends conventionally formed of wood are unsightly due to the necessity for using two cross arm members of relatively large cross section to provide sufficient strength characteristics to resist the bending forces imposed thereupon by the electrical transmission lines.

Pole type construction members formed of glass fiber components have not heretofore had sufficient resistance to bending and flexing to permit elongated poles such as would be suitable in the electric transmission system art to be produced. Previous glass fiber construction member arrangements were unable to overcome the inherent tendency of relatively long and slender glass fiber members to bend or "whip".

SUMMARY OF THE INVENTION

The invention pertains to an arrangement whereby glass fiber components may be assembled in such a manner as to produce elongated construction members generally of a plank configuration which may be of a curved and arcuate configuration having superior strength characteristics, a high resistance to lateral bending and flexing, and a pleasing aesthetic appearance.

In the basic practice of the invention a plurality of elongated high density rods or strips formed of glass fibers impregnated with a hardened resin are interposed or sandwiched between a plurality of superimposed layers of glass fiber fabric impregnated with a hardened resin. The construction member is preferably assembled by placing the fabric upon both sides of the glass fiber rods after the rods are fully cured and completely set. The resin impregnated fabric is applied to the rods, which are generally disposed in a side-by-side relationship, and the resin will directly contact the rods and work into the interstices therebetween during the formation of the construction member. Upon the resin within the fabric hardening, the superimposed fabric layers will be bonded to each other, and the fabric layers will likewise be firmly bonded to the glass fiber rods.

High density glass fiber rods have excellent resistance to tension and compression forces, and the combination of the rods firmly bonded to the glass fiber fabric layer produces a construction which has superior resistance to lateral or bending forces. When such high density glass fiber rods are used in the construction of a plank member, particularly of a longitudinal arcuate configuration, a bracket may be produced which is very suitable for use on electrical transmission poles having very high strength and resistance to breakage, and the dielectric nature of the member makes is particularly suitable for electrical use. Also, in the practice of the invention an attractive configuration with respect to the transverse cross section may be imparted to the member in the shaping of the member within a mold, and the transverse cross section may be used to enhance the appearance as well as improve the physical characteristics.

Usually, the fabric which is to be used will be a woven fabric, and preferably, the glass fibers of the woven fabric which extend in the longitudinal direction of the resultant construction member are continuous. Likewise, the fibers within the rods are preferably of a continuous form extending the length of the rods, and the length of the construction member. However, it is understood that the fabric which may be used could also be of the mat type wherein the glass fibers are indiscriminately arranged, or the fabric may be of a combination of woven and mat construction or of a roving construction.

BRIEF DESCRIPTION OF THE DRAWING

The concepts of the invention will be appreciated from the following specification and attached drawings wherein:

FIG. 1 is a perspective view of a plank type construction member utilizing the inventive concept of the invention, FIG. 2 is an elevational, sectional view of the plank of FIG. 1 as taken along Section II—II thereof, FIG. 3 is an elevational view of a utility pole having a bracket formed in accord with the invention, FIG. 4 is a view of the bracket, per se, as taken from the right of FIG. 3, FIGS. 5 and 6 are elevational sectional views of the bracket taken along Sections V—V and VI—VI of FIG. 3, FIG. 7 is a side, elevational view of a mold in which the bracket of FIGS. 3 through 6 may be formed, and FIG. 8 is an elevational, sectional view taken along Section VIII—VIII of FIG. 7.

DESCRIPTION OF THE PREFERRED EMBODIMENTS

In the described embodiments, the method of the invention is confined to the formation of a plank type construction member such as may be used for general construction purposes, and in the embodiment of FIGS. 3 through 8, the construction member is so formed as to form a bracket for supporting electrical transmission conductors.

With reference to FIGS. 1 and 2, the plank 10 has an outer rectangular configuration which is formed by molding the plank within a mold having a rectangular cavity. In the formation of the plank of FIGS. 1 and 2, several layers 12 of glass fiber fabric are laid in the bottom of a mold 14, shown in dotted lines in FIG. 2, to cover the entire area of the cavity. After several layers 12 of glass fiber are positioned in the mold and these layers are impregnated with a hardenable resin, glass fiber rods 16 are disposed in contiguous relationship to each other extending throughout the length of the mold. The rods 16 extend parallel to the length of the mold, and after being placed upon the lower fabric layers 12, additional resin impregnated layers 18 of glass fiber fabric are superimposed on the rods. The fabric resin will fill the interstices between the rods 16 and the plank having a cross section as represented in FIG. 2 is produced by placing the top half 20 of the mold upon the cavity portion 14 thereof. The resultant intimate bonding between the glass fiber fabric layer portions 12 and 18 and rods 16 produces a construction member 10 of superior strength capable of withstanding tension and compression forces, and highly resistant to lateral deflection.

Glass fiber fabric is available in rolls of considerable length, and of various widths. For instance, a roll of glass fiber fabric having a width of 48 inches may be used in forming construction members in accord with the invention. The operator unrolls a length of fabric from the supply roll which is equal to the length of the desired construction member, and this length is severed from the supply roll. The fabric is then impregnated with a hardenable resin, such as epoxy, a polyester compound, or a phenolic compound. The impregnated resin fabric 12 is laid within the cavity of mold portion 14, and sufficient layers of fabric are located in the mold portion to produce the desired fabric layer thickness upon which the rods 16 are laid.

The rods 16 may be formed in a manner as disclosed in U. S. Pat. No. 2,684,318. Such rods are formed of glass fiber filaments impregnated with a hardened resin while under tension, and drawn through a sizing die. The rods may be ground after the resin has set and cured, if desired, wherein the rods will be of an accurate uniform diameter or the sizing may remain as that determined by the forming die.

Sufficient resin is applied to the fabric layers wherein application of the rods 16 upon the fabric layers causes the resin within the fabric to work into the voids between the rods, eliminating the occurrence of voids in the region occupied by the rods and resulting in a solid, homogeneous connection between the rods and fabric. Likewise, the application of the fabric layers to produce layers 18 produces a homogenous interconnection between the rods and the layers 18, and after the plank has hardened and cured a high strength homogeneous construction member is formed.

The fabric used to form the layers 12 and 18 may be of most of the fabric layer sheet material constructions available for glass fiber construction purposes, such as woven fabric, mat or roving. The preferred fabric is of the woven type having glass fiber filaments which extend the length of the construction member being formed. The resultant construction member has extraordinary resistance to fracturing and lateral or bending deflection. Such resistance is greater than that which is produced by a plurality of glass fiber rods bonded together, and greater than that provided with a constructional member consisting solely of fabric impregnated with a hardened resin. Thus, an all glass fiber construction member is produced which provides the dielectric, noncorrosive and appearance advantages of glass fiber, while producing very high resistance to deflection.

FIGS. 3 through 8 are directed to another construction member constructed in accord with the invention which uses the inventive concepts thereof in a bracket of the cantilever type which may be affixed to utility electrical system poles for the support of insulators and conductors, lights, or other accessories. In FIG. 3 the upper portion of a pole 22 is illustrated having a bracket 24 which is affixed thereto.

The bracket 24 is attached to the upper end of the pole 22 for the purpose of supporting insulators 26 at the free end thereof. A conductor would normally be supported by the insulator 26.

The bracket 24 includes a free end 28 to which the insulator 26 depends. The lower end of the bracket includes a portion 30 which is affixed to the pole 22, and the curved intermediate portion of the bracket is indicated at 32.

The bracket 24 is attached to the pole 22 by means of bolts extending through holes 34 and 36, FIG. 4, defined through the bracket portion 30. If desired, the hole 36 may be of an elongated form to compensate for minor dimensional variations existing in the pole bolt holes. Bolts 38 extend through drilled holes in the pole 22, and also extend through the bracket holes 34 and 36 wherein the arcuate plates 40 may be located under the bolt nuts to eliminate localized stress points upon the bracket 24 when the nuts of the bolts 38 are tightened to firmly affix the bracket 24 to the pole 22.

The brackets 24 may basically be considered to be of a "plank" form. However, the bracket is curved in a longitudinal direction as is apparent from FIG. 3, and is also provided with arcuate surfaces extending in a transverse direction, as will be later described.

The bracket 24 is formed by a molding operation of glass fiber fabric and glass fiber rods, assembled and bonded together in a manner somewhat similar to that described above with respect to the embodiment of FIGS. 1 and 2. As shown in FIGS. 5 and 6, the bracket includes a portion 42 which consists of a plurality of superimposed layers of glass fiber fabric impregnated with a hardenable resin. A plurality of high density glass fiber rods 44 are disposed adjacent the glass fiber fabric portion 42 in such a manner that the rods are substantially contiguous to each other in a side-by-side relationship, and extend the length of the bracket.

An intermediate glass fiber fabric portion 46 consisting of a plurality of glass fiber layers impregnated with a hardened resin are disposed upon the opposite side of the rods 44, with respect to the glass fiber fabric portion 42, and the resin within the portion 42 and 46 will fill the interstices intermediate the rods 44.

Another layer or series of high density glass fiber rods 48 is included within the bracket 24 disposed adjacent the intermediate fabric portion 46, and these rods are related to each other in a manner similar to the previously described rods 44. The third glass fiber fabric portion 50 is disposed adjacent the rods 48 upon the opposite side thereof with respect to the portions 46, and the portion 50 is similar in composition and assembly to the portion 42.

The resultant cross-sectional configuration of the bracket 24 will be appreciated from FIGS. 5 and 6, wherein the bracket will be formed solely of glass fiber components of both fabric and rod character.

The free end of the bracket 24 is preferably of a flat rectangular cross section as is apparent in FIG. 5. However, except for that bracket portion 28 immediately adjacent the free end of the bracket, the remaining length of the bracket 24 is preferably of a convex-concave configuration as is apparent from FIG. 6. Thus, the convex-concave cross-sectional configuration of the bracket 24 will include a convex surface 52 and a concave surface 54. The edges 56 are preferably substantially parallel and are related to the surfaces 52 and 54 in a manner that will be apparent from FIG. 6.

The radius of the bracket surface 54 preferably substantially corresponds to the radius of the pole 22. Thus, upon mounting the bracket 24 upon the pole 22 in the manner illustrated, a solid connection of the bracket to the pole is assured which prevents the existence of localized stresses on the bracket portion 30, and also aligns the bracket portion 30 with the longitudinal axis of the pole 22.

The bracket 24 may be formed in a mold shown in simplified form in FIGS. 6 and 8. In its simplest form the mold may be of metal, wood or glass fiber consisting of a lower portion 58 and an upper portion 60. The parting line between the mold portions is represented at 62. A recess 64 is defined within the mold portion 58 having a convex surface in order to form the concave surface 54. The recess 64 is defined by the edge surfaces 68. The uppermost portion 60 includes a concave surface 70 which determines the configuration of the convex surface 52 of the bracket.

The bracket 24 is formed by laying a plurality of glass fiber fabric strips within the mold recess 64, wherein the strips are of a length equal to the cavity, and of a width substantially equal to that defined by the edges surfaces 68. A sufficient number of glass fiber fabric layers are positioned within the mold recess 64 to define the thickness of the bracket portion 50 desired. Thereupon a plurality of high density glass fiber rods 48 are laid in contiguous side-by-side relationship upon the fabric forming the portion 50. After the rods 48 are located in place, the intermediate glass fiber portion 46 is built up upon the rods 48 by a plurality of glass fiber fabric layers impregnated with a hardenable resin. When the proper thickness of portion 46 has been achieved, the rods 44 are therein laid upon the portion 46 in side-by-side relationship, and the glass fiber fabric portion 42 is then built up upon the rods 44 with a plurality of fabric layers. The uppermost portion 60 is then laid in place which will shape the surface 52 in accord with the mold recess 70. After the bracket 24 has hardened it may be removed from the mold, and the ends may be trimmed, if desired. The holes 34 and 36 are preferably drilled into the bracket.

As in the previously described embodiment of the invention, the fabrication of the bracket 24 will completely fill the interstices between the rods 44 and 48 with hardenable resin with which the glass fiber is impregnated. Thus, a solid, homogeneous bracket will be formed. It is to be noted that in the drawings of all of the embodiments the resin filling the interstices between the rods is not illustrated by shading in order to prevent obscuring the relationship between the rods and the adjacent glass fiber portions. The bending stress that is placed upon the bracket 24 due to the weight of the conductor connected to the insulator 26 will place the rods 48 in tension, while the rods 44 will tend to be in compression. By separating the rods 44 and 48 by the intermediate glass fiber fabric portion 46 the rods are thus able to add considerable strength to the bracket 24 over the strength which would be present if the bracket were entirely formed of glass fiber fabric without rods. As the rods 44 and 48 are spaced from the neutral axis of the bracket, with respect to lateral bending stresses, the construction of the bracket 24 is more effective to resist bending than is the construction utilized in the manufacture of the plank 10. Also, the convex-concave configuration of the bracket 24 itself contributes to strengthening the bracket against lateral deflection.

While the illustrated embodiment of FIGS. 3 through 8 is utilized in the electrical power transmission system art it will be appreciated that the inventive concepts find wide use in a wide variety of the construction and building arts. The invention is described in conjunction with electrical power transmission devices in that the strength, resistance to corrosion, dielectric characteristics and attractive appearance of components constructed in accord with the invention are highly desirable in this particular art.

It is appreciated that various modifications to the inventive concepts may be apparent to those skilled in the art without departing from the spirit and scope thereof.

I claim:

1. The method of forming an elongated construction member of glass fiber material employing a mold having an elongated recess, comprising the steps of placing superimposed layers of glass fiber fabric impregnated with a hardenable binder resin within the mold recess to form a first thickness of glass fiber fabric, placing a plurality of elongated, high density glass rods consisting of a plurality of longitudinally disposed glass fibers bonded together with a hardened binder resin while under tension in said recess substantially parallel to the length of the recess forming a first layer of glass rods, placing a plurality of superimposed layers of glass fiber fabric impregnated with a hardenable resin upon said rods to form a second thickness of glass fiber fabric, the amount of binder resin impregnating said first and second thickness of glass fiber fabric being in excess of that necessary to impregnate only the associated fiber, the resin of said thicknesses of fabric entering the interstices between said rods, and hardening said hardenable resin to form an integral, homogeneous, bonded member.

2. A method of forming an elongated construction member of glass fiber material as in claim 1 including the steps of placing a plurality of elongated, high density, glass fiber rods consisting of a plurality of longitudinally disposed glass fibers bonded together with a hardened binder resin while under tension in said recess on said second thickness of glass fiber fabric substantially parallel to the length of the recess forming a second layer of glass rods spaced from said first layer of glass rods, and placing a plurality of superimposed layers of glass fiber fabric impregnated with a hardenable resin upon said last mentioned plurality of rods to form a third thickness of glass fiber fabric, the amount of hardenable resin impregnating said third thickness of glass fiber fabric being in excess of that necessary to impregnate only the associated fabric of said third thickness.

* * * * *